(12) United States Patent
Santos

(10) Patent No.: US 8,363,823 B1
(45) Date of Patent: Jan. 29, 2013

(54) TWO MICROPHONE UPLINK COMMUNICATION AND STEREO AUDIO PLAYBACK ON THREE WIRE HEADSET ASSEMBLY

(75) Inventor: Peter Santos, Los Altos, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/568,989

(22) Filed: Aug. 7, 2012

Related U.S. Application Data

(60) Provisional application No. 61/521,294, filed on Aug. 8, 2011.

(51) Int. Cl.
*H04M 1/00* (2006.01)
*H04M 9/00* (2006.01)
*H04R 1/10* (2006.01)
*H04R 25/00* (2006.01)

(52) U.S. Cl. ......... 379/430; 381/384; 381/74; 381/71.1; 381/94.1; 455/575.2

(58) Field of Classification Search .................. 379/430; 381/370, 384, 74, 71.1, 94.1; 455/569.1, 455/569.2, 570, 575.2
See application file for complete search history.

(56) References Cited

U.S. PATENT DOCUMENTS

| | | | | |
|---|---|---|---|---|
| 5,289,273 | A * | 2/1994 | Lang | 348/121 |
| 6,061,456 | A * | 5/2000 | Andrea et al. | 381/71.6 |
| 6,219,408 | B1 * | 4/2001 | Kurth | 379/106.02 |
| 6,748,095 | B1 * | 6/2004 | Goss | 381/374 |

* cited by examiner

*Primary Examiner* — Tuan Nguyen
(74) *Attorney, Agent, or Firm* — Carr & Ferrell LLP

(57) ABSTRACT

Disclosed are methods and devices for communicating between a user device, such as a mobile terminal, and a three wire headset assembly having two microphones coupled thereto. The methods provide two microphone uplink communication and stereo audio playback on a three wire headset assembly without requiring a fourth wire or the addition of a separate voice processor. The headset assembly includes a primary microphone and secondary microphone spaced some distance apart for applying techniques of noise reduction and suppression. The headset assembly includes two speakers. Controlled switches are also included in both the user device and headset assembly to achieve dual use for a single wire of the three wires. The three wire headset may advantageously support both stereo playback and two microphone voice processing. In some embodiments, two microphone noise suppression for a wired headset mode of the user device is provided.

26 Claims, 7 Drawing Sheets

"TALK MODE"

TWO MICROPHONE UPLINK COMMUNICATION AND STEREO AUDIO PLAYBACK ON THREE WIRE HEADSET ASSEMBLY

CROSS-REFERENCES TO RELATED APPLICATIONS

This application claims the benefit of U.S. Provisional Patent Application No. 61/521,294, filed Aug. 8, 2011, which is hereby incorporated by reference in its entirety.

This application is related to U.S. Non-Provisional patent application Ser. No. 12/832,920, filed Jul. 8, 2010, titled: "Multi-Microphone Robust Noise Suppression." This application is also related to U.S. Non-Provisional patent application Ser. No. 12/215,980, filed Jun. 30, 2008, titled: "System and Method for Providing Noise Suppression Utilizing Null Processing Noise Subtraction." The disclosures of the aforementioned applications are hereby incorporated by reference in their entireties.

TECHNICAL FIELD

The application generally relates to communication between mobile terminals and headsets and, more specifically, to the technology of communicating audio signals between a three wire headset assembly having two microphones and a mobile terminal without requiring a fourth wire or the addition of a dedicated voice processor.

BACKGROUND

Headsets are typically used to provide hands-free operation for the users of computers, telephones, mobile devices, and other electronic devices. A conventional headset includes headphones combined with a microphone, or one headphone with a microphone. The headsets can be wired or wireless, and when they are plugged into or operatively connected to the user device, the headsets can enable users to listen to audio signals received from the user device and transfer speech (voice) to the user device. Headsets can be used in call centers and other telephone-intensive jobs and for anyone wanting both hands free during a telephone conversation.

The headsets may be provided with two or more microphones that can be used for various purposes. When two microphones are used, typical headsets, if wired, are four wire devices. In these devices, two wires are used for the headphones and the other two wires are used for the two microphones. It can be disadvantageous to require addition of a fourth wire or a separate voice processor to a three wire headset assembly in order to enable two microphone uplink communication and stereo audio playback for a two microphone wired headset.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure relates to methods for communicating between a user device and a three wire headset assembly having two microphones coupled thereto. More specifically, the methods provide two microphone uplink communication and stereo audio playback on a three wire headset assembly without requiring a fourth wire or the addition of a separate voice processor to the headset assembly. In various embodiments, the headset assembly includes a primary microphone and a separate secondary microphone. The use of two microphones enables applying various audio (voice) processing techniques for non-stationary (NS) noise reduction and suppression based upon signals derived from the primary microphone and the secondary microphone.

The headset assembly also includes two speakers, namely a left speaker and a right speaker. Controlled switches may also be included in both the user device and the three wire headset assembly to achieve dual use for a single wire of the three wires. The three wire headset may advantageously support both stereo playback and two microphone voice processing, according to various embodiments of the present disclosure.

Embodiments described herein may be practiced on any user device that is configured to receive and/or provide audio such as, but not limited to, personal computers, tablet computers, mobile devices, cellular phones, media devices, and systems for teleconferencing applications. Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
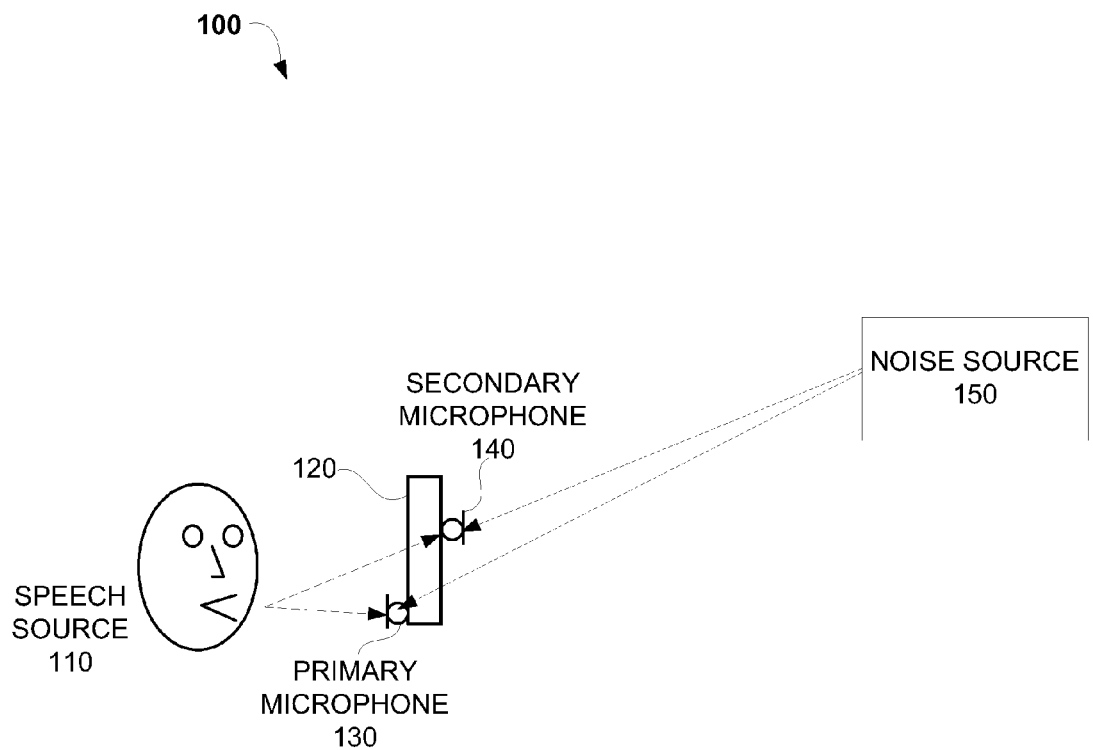
FIG. 1 is an illustration of an environment in which embodiments of the present technology may be used.

Various aspects of the subject matter disclosed herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects may be practiced without these specific details. In other instances, well-known structures and devices are shown in block diagram form in order to facilitate describing one or more aspects.

The present technology provides methods and systems for communicating between a user device and a three wire headset assembly having two microphones. The communication is configured so that the three wire headset supports both stereo playback and two microphone voice processing without a need to use a fourth wire or any dedicated processor or processor operations.

In various embodiments of the present disclosure, the two microphone voice processing enables using various techniques for noise (and echo) reduction and suppression. These techniques can be implemented in the user device for signals received from a primary microphone and secondary microphone embedded in the headset assembly. Alternatively, these techniques can be implemented in the three wire headset assembly (with help of a processor or another noise suppression device). In particular, these technique can implement a combination of subtractive and multiplicative stages as described in related U.S. patent application Ser. No. 12/832,920, filed Jul. 8, 2010, titled: "Multi-Microphone Robust Noise Suppression," and U.S. patent application Ser. No. 12/215,980, filed Jun. 30, 2008, titled: "System and Method for Providing Noise Suppression Utilizing Null Processing Noise Subtraction," which are incorporated herein by a reference in their entireties. A method for noise suppression, according to various embodiments, is disclosed in U.S. patent application Ser. No. 12/215,980, as including receiving at least a primary and a secondary microphone signals; subtracting a desired signal component from the secondary microphone signal to obtain a noise component signal; performing a first determination of at least one energy ratio related to the desired signal component and the noise component signal; performing a second determination of whether to adjust the noise component signal based on the at least one energy ratio; adjusting the noise component signal based on the second determination; subtracting the noise component signal from the primary microphone signal to generate a noise subtracted signal; and outputting the noise subtracted signal. Further detailed description of noise reduction and suppression techniques is omitted so as to not burden the disclosure of the present technology.

FIG. 1 is an illustration of an example environment 100 within which embodiments of the present technology may be used. A user may act as a speech source 110, hereinafter audio source 110, to a headset assembly 120. The exemplary headset assembly 120 includes two microphones, namely a primary microphone 130 located relatively close to the audio source 110 and a secondary microphone 140 located a distance away from the primary microphone 130. In yet other embodiments, the headset assembly 120 may include more than two microphones, such as, for example three, four, five, six, seven, eight, nine, ten or even more microphones. Furthermore, in an embodiment, the primary microphone 130 and secondary microphone 140 may be omni-directional microphones. Alternatively, other forms of microphones or acoustic sensors, such as directional microphones, can be used.

While the primary microphone 130 and secondary microphone 140 receive sound (i.e., audio signals) from the audio source 110, the primary microphone 130 and secondary microphone 140 also pick up noise originated from more noise sources 150. Although the noise is shown coming from a single location in FIG. 1, the noise may include any sounds from one or more locations that differ from the location of audio source 110, and may include reverberations and echoes. The noise may be stationary, non-stationary, or a combination of both stationary and non-stationary noise.

Some embodiments may utilize level differences (e.g., energy differences) between the acoustic signals received by the primary microphone 130 and secondary microphone 140. Because the primary microphone 130 can be closer to the audio source 110 than the secondary microphone 140 in a close-talk use case, the intensity level is higher for the primary microphone 130, resulting in a larger energy level received by the primary microphone 130 during a speech/voice segment, for example.

The level difference may then be used to discriminate between speech and noise in the time-frequency domain. Further embodiments may use a combination of energy level differences and time delays to discriminate speech. For example, based on binaural cue encoding, speech signal extraction or speech enhancement may be performed.

Figure 2:
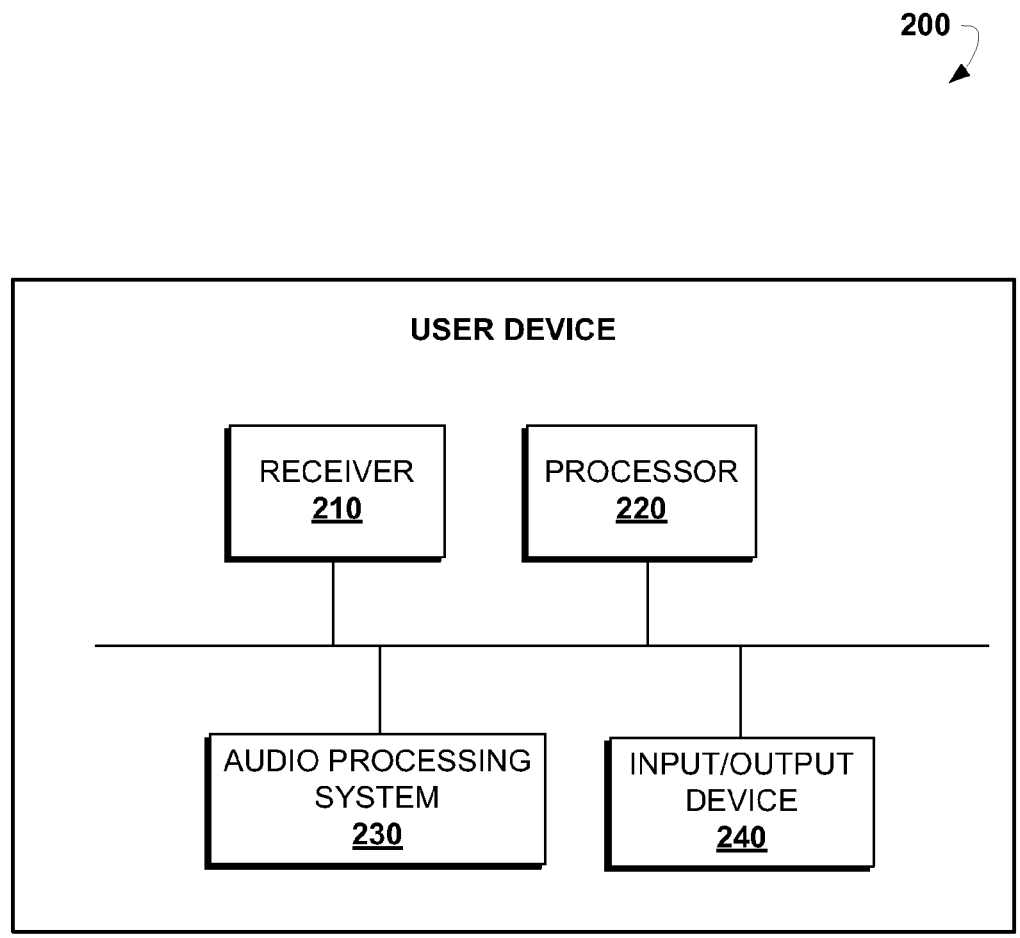
FIG. 2 is a block diagram of an exemplary user device to which a three wire headset assembly can be coupled.

FIG. 2 is a block diagram of an exemplary user device 200 to which a three wire headset assembly can be coupled. In the illustrated embodiment, user device 200 includes a receiver 210, a processor 220, an audio processing system 230, and an input/output device 240. The user device 200 may include further or other components necessary for user device 200 operations such as a microphone, speakers, display, keypad, wireless transmitting/receiving unit, and so forth. Similarly, the user device 200 may include fewer components that perform similar or equivalent functions to those depicted in FIG. 2.

Those skilled in the art will appreciate that the user device 200 is referred to may be a computer (e.g., a desktop computer, a laptop computer, and a tablet computer), media device, telephone, teleconferencing device, and so forth.

The exemplary receiver 210 is an acoustic sensor configured to receive a signal from a communications network. In various embodiments, the receiver 210 may include an antenna device. Using the techniques described herein, the signal may then be forwarded to the audio processing system 230 to reduce noise and provide an audio signal to the input/output device 240.

Processor 220 may execute instructions and modules stored in a memory (not illustrated in FIG. 2) in the user device 200 to perform functionality described herein, including noise reduction for an acoustic signal. Processor 220 may include hardware and software implemented as a processing unit, which may process floating point operations and other operations for the processor 220.

The audio processing system 230 is configured to receive the acoustic signals originated from an acoustic source via the receiver 210 and/or the input/output device 240 and process the acoustic signals. For example, the audio processing system 230 can receive and process acoustic signals captured by the primary microphone 130 and secondary microphone 140 of the three wire headset assembly 120. Processing may include performing noise reduction within acoustic signals. More specifically, the primary microphone 130 and secondary microphone 140 may be spaced a distance apart in order to allow for detecting an energy level difference, time difference, or phase difference between them. The acoustic signals received by the primary microphone 130 and secondary microphone 140 may be converted into electrical signals. The electrical signals may themselves be converted by an analog-to-digital converter (not shown) into digital signals for processing in accordance with some embodiments. In order to differentiate the acoustic signals for clarity purposes, the acoustic signal received by the primary microphone 130 is herein referred to as the primary microphone signal, while the acoustic signal received by the secondary microphone 140 is herein referred to as the secondary microphone signal. The primary microphone signal and the secondary microphone signal may be processed by the audio processing system 230 to produce a signal with an improved signal-to-noise ratio.

The input/output device 240 is configured to communicate with the three wire headset assembly 120 so as to provide an audio output to the user in the form of stereo audio signals and receive the primary microphone signals and secondary microphone signals. The input/output device 240 may include four nodes including a primary microphone node, a secondary microphone node, a right speaker node, and a left speaker node. The input/output device 240 may also include one or more switches to enable selectively coupling one or more aforementioned nodes to one or more signal wires (not shown). According to various embodiments, the input/output device 240 may also include one or more controllers (not shown) to operate the aforementioned switches. Alternatively, the switches can be controlled by the processor 220 based upon a number of predetermined criteria.

Figure 3:
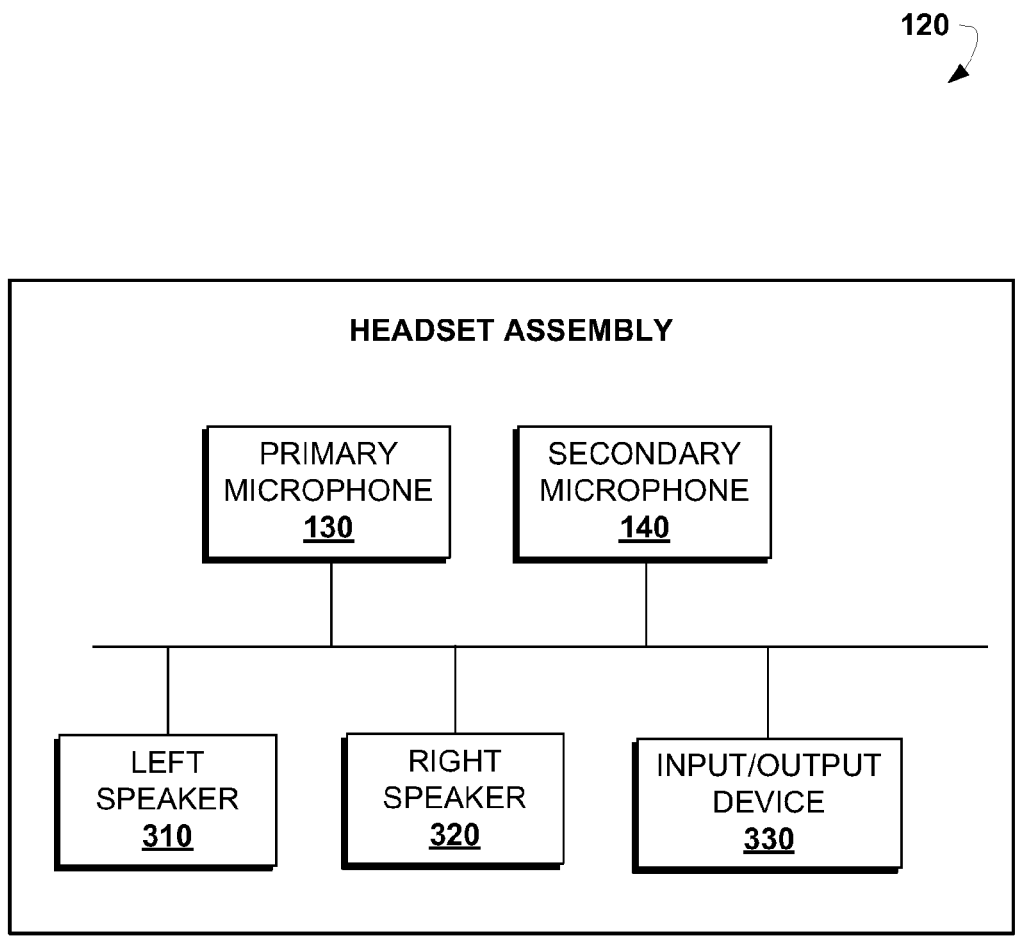
FIG. 3 is a block diagram of an exemplary three wire headset assembly which can be operatively coupled to a user device.

FIG. 3 is a block diagram of an exemplary three wire headset assembly 120, which can be operatively coupled to the user device 200. As shown in the figure, the three wire headset assembly 120 includes a primary microphone 130, a secondary microphone 140, a left speaker 310, a right speaker 320, and an input/output device 330. The three wire headset assembly 120 may include further or other components necessary for three wire headset assembly 120 operations. For example, the three wire headset assembly 120 may optionally include a processor or controller. Similarly, the three wire headset assembly 120 may include fewer components that perform similar or equivalent functions to those depicted in FIG. 3.

The input/output device 330 can be configured to communicate with the user device 200. In particular, the input/output device 330 can receive stereo audio signals and transmit primary and secondary microphone signals. The input/output device 330 may include four nodes including a primary microphone node, a secondary microphone node, a right speaker node, and a left speaker node. The input/output device 330 may also include one or more switches to enable selectively coupling one or more aforementioned nodes to one or more signal wires (not shown). The switches can be controlled by a processor embedded within the three wire headset assembly 120 or by the processor 220 of the user device 200.

Figure 4:
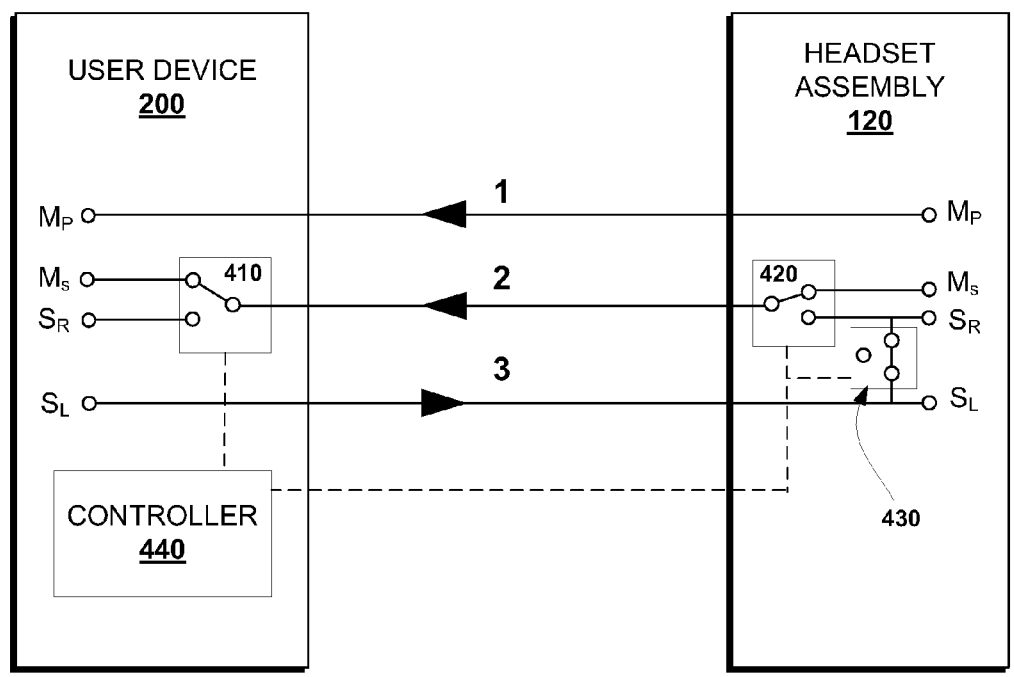
FIG. 4 is a block diagram of an exemplary system for wired communication between the user device and the three wire headset assembly in a first mode.

FIG. 4 is a block diagram of an exemplary system 400 for wired communication between the user device 200 and the three wire headset assembly 120 in a first mode. As shown in the figure, the system 400 includes the user device 200, the three wire headset assembly 120 and three signal wires (Wire 1, 2, and 3) that may be coupled therebetween. For simplicity, the "ground" reference potential is not shown in FIG. 4. A plurality of nodes are included in both the user device 200 and the three wire headset assembly 120 including a primary microphone node (MP), secondary microphone node (MS), right speaker node (SR), and left speaker node (SL).

The user device 200 may include a switch 410 coupled between the MS and SR nodes of the user device 200 and having a control input controlled by a controller 440.

The control signal from the controller 440 may originate in the user device 200 and/or in the three wire headset assembly 120. One of the three wires coupled between the user device 200 and the three wire headset assembly 120 may be utilized for coupling the control signal between the user device 200 and three wire headset assembly 120 such that an additional wire is not needed.

The three wire headset assembly 120 may be a headset assembly having a three wire output as shown in FIG. 4 for a suitable headset jack (ground not shown for simplicity). The three wire headset assembly 120 may include a switch 420 coupled between the MS and SR nodes of the three wire headset assembly 120 and having a control input commonly controlled by the controller 440. Another switch 430 coupled between the SR and SL nodes may also be included in the three wire headset assembly 120 and be commonly controlled by the controller 440.

The communication between the user device 200 and the three wire headset assembly 120 may be realized in two modes. The first mode, or in other words the "Talk Mode," is shown in FIG. 4. The second mode, or in other words the "Play Mode," is shown in FIG. 5.

For a user device configured in a voice/video communication, record or speech recognition mode, the switches 410-430 in the user device 200 and the three wire headset assembly 120 may be configured as shown in "Talk Mode" in FIG. 4. In the exemplary "Talk Mode," via signal wire 2, the secondary microphone (MS) node from the three wire headset assembly 120 is selectively coupled to a corresponding secondary microphone (MS) node of the user device 200 to provide secondary microphone signals from the three wire headset assembly 120 to the user device 200. The right and left speaker nodes, SR and SL, of the three wire headset assembly 120 may be intercoupled in the three wire headset assembly 120 as shown in FIG. 4. In the "Talk Mode," a primary microphone (MP) node of the three wire headset assembly 120 is coupled via signal wire 1 to the corresponding primary microphone (MP) node of the user device 200 to provide primary microphone signals from the three wire headset assembly 120 to the user device 200. The signal wire 3 may couple the left speaker (SL) node of the user device 200 to both the left speaker (SL) and right speaker (SR) nodes of the three wire headset assembly 120 in the exemplary "Talk Mode" shown.

Thus, in "Talk Mode," both the primary microphone (MP) and secondary microphone (MS) signals from the three wire headset assembly 120 are provided to the user device 200, and the left speaker (SL) node of the user device 200 is coupled to the left and right speakers of the three wire headset assembly 120 via the left speaker (SL) and right speaker (SR) nodes.

Figure 5:
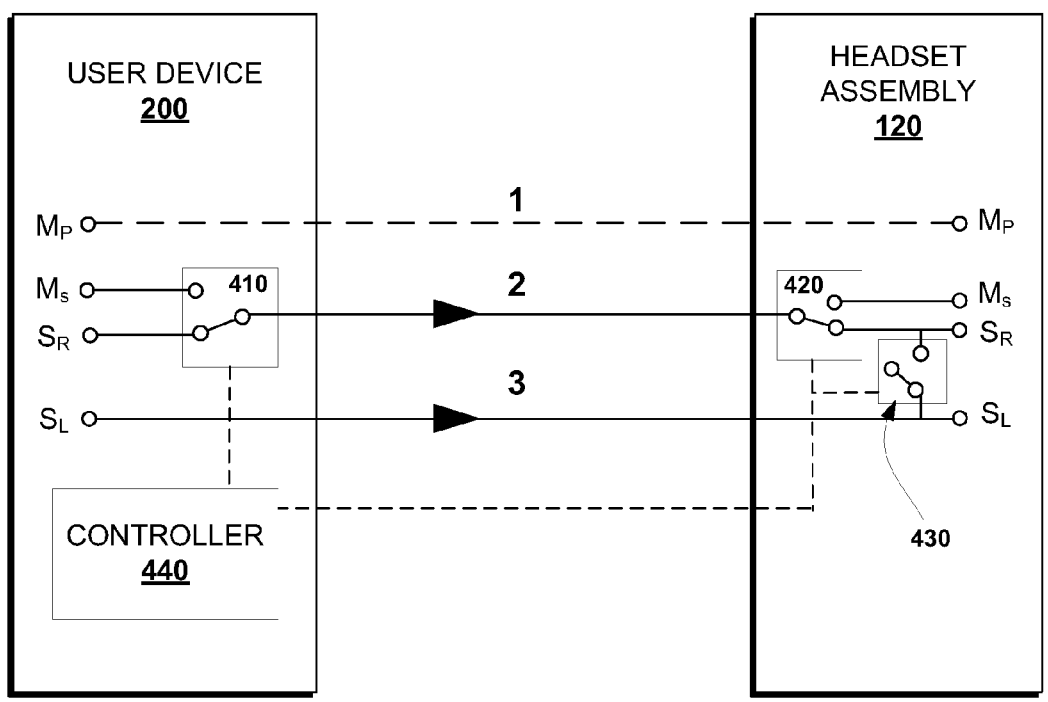
FIG. 5 is a block diagram of an exemplary system for wired communication between the user device and the three wire headset assembly in a second mode.

In another mode, "Play Mode," the switches 410-430 in the user device 200 and the three wire headset assembly 120 may be configured as shown in FIG. 5. In the "Play Mode," via signal wire 2 and the switches 410 and 420 coupled thereto, the right speaker (SR) node of the three wire headset assembly 120 may be selectively coupled to the corresponding right speaker (SR) node of the user device 200. The right and left speaker nodes, SR and SL, of the three wire headset assembly 120 may be selectively decoupled via the switch 430 as shown in FIG. 5.

In the "Play Mode," the signal wire 1 can be inactive, as shown by the dashed line, or can be used for receiving the primary microphone signals from the three wire headset assembly 120. The signal wire 3, for "Play Mode," couples the left speaker (SL) node of the user device 200 to the corresponding left speaker (SL) node of the three wire headset assembly 120. Thus, in "Play Mode," signal wires 2 and 3 are used for driving respective speakers 310 and 320 of the three wire headset assembly 120 via the left speaker (SL) and right speaker (SR) nodes.

Figure 6:
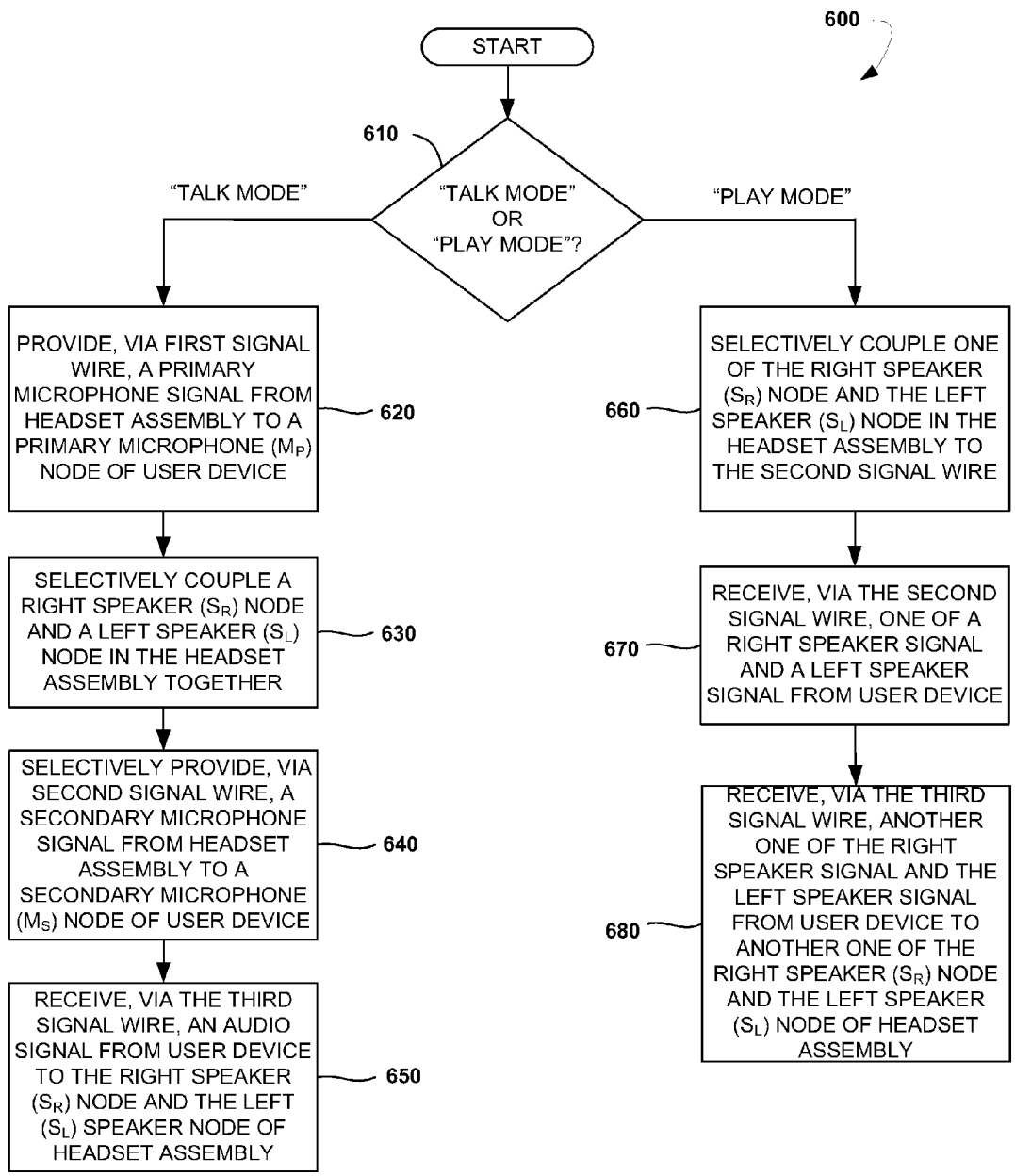
FIG. 6 is a flowchart of an exemplary method for communicating between the user device and the three wire headset assembly.

FIG. 6 is a flowchart of an exemplary method 600 for communicating between the user device 200 and the three wire headset assembly 120. The method 600 can be performed by various components of the three wire headset assembly 120.

The method 600 may commence at operation 610 with determining in which mode, "Talk Mode" (i.e., first mode) or "Play Mode" (i.e., second mode), the communication between the user device 200 and the three wire headset assembly 120 shall be established. For example, when the three wire headset assembly 120 is used for providing both the primary microphone signal and the secondary microphone signal to the user device 200, then "Talk Mode" can be selectively enabled. Alternatively, when the three wire headset assembly 120 is not used for providing both the primary and secondary microphone signals to the user device 200, then "Play Mode" can be selectively enabled. The change from "Talk Mode" to "Play Mode" can be performed by the controller 440 (or the processor 220) by generating corresponding control signals to the switches 410-430. The control signals can be transmitted to the switches 420, 430 via one of the signal wires 1-3 or via another wire or medium.

When "Talk Mode" is enabled, the following operations 620-650 are performed:

At operation 620, the three wire headset assembly 120 provides, via the signal wire 1, a primary microphone signal from the three wire headset assembly 120 to a primary microphone (Mp) node of the user device 200.

At operation 630, the three wire headset assembly 120 selectively couples together a right speaker (SR) node and a left speaker (SL) node in the three wire headset assembly 120.

At operation 640, the three wire headset assembly 120 selectively provides, via the signal wire 2, a secondary microphone signal from the three wire headset assembly 120 to a secondary microphone (MS) node of the user device 200.

At operation 650, the three wire headset assembly 120 receives, via the signal wire 3, an audio signal from the user device 200 to the right speaker (SR) node and the left (SL) speaker node of the three wire headset assembly 120.

When "Play Mode" is enabled, the following operations 660-680 are performed:

At operation 660, the three wire headset assembly 120 selectively couples one of the right speaker (SR) node and the left speaker (SL) node in the three wire headset assembly 120 to the signal wire 2.

At operation 670, the three wire headset assembly 120 receives, via the signal wire 2, one of a right speaker signal and a left speaker signal from the user device 200.

At operation 680, the three wire headset assembly 120 receives via the signal wire 3 another one of the right speaker signal and the left speaker signal from the user device 200 to another one of the right speaker (SR) node and the left speaker (SL) node of the three wire headset assembly 120.

Figure 7:
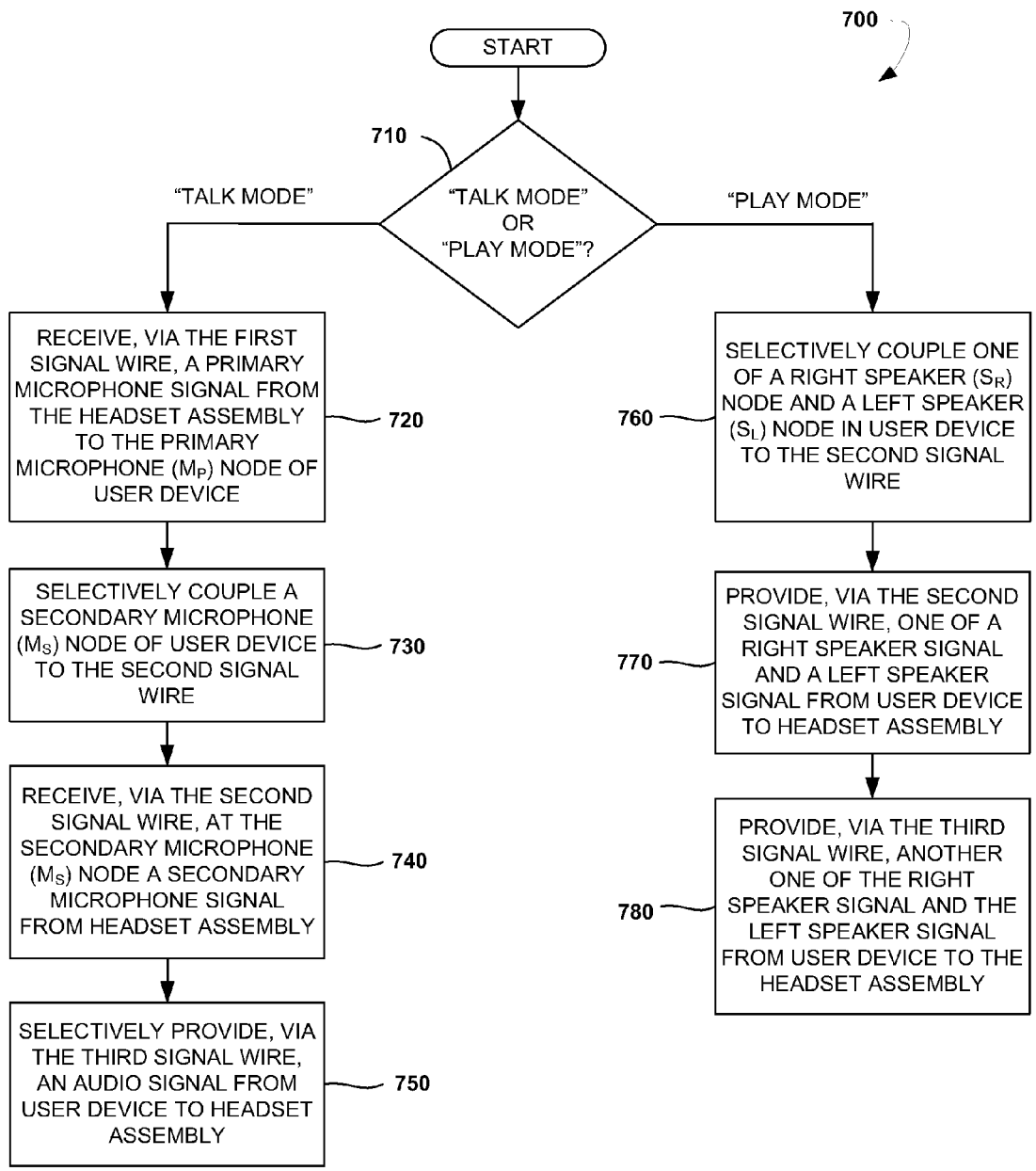
FIG. 7 is a flowchart of another exemplary method for communicating between the user device and the three wire headset assembly.

FIG. 7 is a flowchart of another exemplary method 700 for communicating between the user device 200 and the three wire headset assembly 120. The method 700 can be performed by various components of the user device 200.

The method 700 may commence at operation 710 with determining in which mode, "Talk Mode" (i.e., first mode) or "Play Mode" (i.e., second mode), the communication between the user device 200 and the three wire headset assembly 120 shall be established. For example, when the three wire headset assembly 120 is used for providing both the primary microphone signal and the secondary microphone signal to the user device 200, then "Talk Mode" can be selectively enabled. Alternatively, when the three wire headset assembly 120 is not used for providing both the primary and secondary microphone signals to the user device 200, then "Play Mode" can be selectively enabled. The change from "Talk Mode" to "Play Mode" can be performed by the controller 440 (or the processor 220) by generating corresponding control signals to the switches 410-430. The control signals can be transmitted to the switches 420, 430 via one of the signal wires 1-3 or via another wire or medium.

When "Talk Mode" is enabled, the following operations 720-750 are performed:

At operation 720, the user device 200 receives, via the signal wire 1, a primary microphone signal from the three wire headset assembly 120 to the primary microphone (Mp) node of the user device 200.

At operation 730, the user device 200 selectively couples a secondary microphone (MS) node of the user device 200 to the signal wire 2.

At operation 740, the user device 200 receives, via the signal wire 2, a secondary microphone signal from the three wire headset assembly 120 at the secondary microphone (MS) node.

At operation 750, the user device 200 selectively provides, via the signal wire 3, an audio signal from the user device 200 to the three wire headset assembly 120.

When "Play Mode" is enabled, the following operations 760-780 are performed:

At operation 760, the user device 200 selectively couples one of a right speaker (SR) node and a left speaker (SL) node in the user device 200 to the signal wire 2.

At operation 770, the user device 200 provides, via the signal wire 2, one of a right speaker signal and a left speaker signal from the user device 200 to the three wire headset assembly 120.

At operation 780, the user device 200 provides, via the signal wire 3, another one of the right speaker signal and the left speaker signal from the user device 200 to the three wire headset assembly 120.

It should be noted that the methods 600 and 700 may be performed by processing logic that may include hardware (e.g., dedicated logic, programmable logic, microcode, etc.), software (such as run on a general-purpose computer system or a dedicated machine), or a combination of both. In one example embodiment, the processing logic resides at the processor 220 and/or controller 440.

Thus, various methods and systems for communication between a user device, such as a mobile terminal, and a three wire headset assembly having two microphones are provided. Various embodiments of the present disclosure enable a three wire headset assembly to support both stereo playback and two microphone voice processing such as two microphone non-stationary noise reduction. Moreover, the methods and systems described herein may be used to selectively provide two microphone non-stationary noise reduction and stereo audio playback on a three wired headset without moving from three to four wires, or adding a separate voice processor element to the headset assembly.

While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A method for communicating between a user device and a three wire headset assembly, comprising:
    providing in a first mode, via a first signal wire, a primary microphone signal from the three wire headset assembly to a primary microphone node of the user device;
    selectively coupling in the first mode a right speaker node and a left speaker node in the three wire headset assembly;

selectively providing in the first mode, via a second signal wire, a secondary microphone signal from the three wire headset assembly to a secondary microphone node of the user device; and receiving in the first mode, via a third signal wire, an audio signal from the user device to the right speaker node and the left speaker node of the three wire headset assembly.

2. The method of claim 1, further comprising:
determining that the three wire headset assembly is used for providing the primary microphone signal and the secondary microphone signal to the user device; and
selectively enabling the first mode responsive to the determination that the three wire headset assembly is used for providing the primary microphone signal and the secondary microphone signal to the user device.

3. The method of claim 1, further comprising receiving in the first mode, by the three wire headset assembly, a first control command from the user device, wherein the first control command causes coupling of the right speaker node and the left speaker node in the three wire headset assembly.

4. The method of claim 3, wherein the first control command further causes coupling one of the primary microphone node and the secondary microphone node in the three wire headset assembly to the second signal wire.

5. The method of claim 3, wherein the first control command is received in the three wire headset assembly via one or more of the following: the first signal wire, the second signal wire, and the third signal wire.

6. The method of claim 1, further comprising:
determining that the three wire headset assembly is not used for providing the primary microphone signal and the secondary microphone signal to the user device; and
selectively enabling a second mode responsive to the determination that the three wire headset assembly is not used for providing the primary microphone signal and the secondary microphone signal to the user device.

7. The method of claim 6, further comprising:
selectively coupling in the second mode one of the right speaker node and the left speaker node in the three wire headset assembly to the second signal wire;
receiving in the second mode, via the second signal wire, one of a right speaker signal and a left speaker signal from the user device to one of the right speaker node and the left speaker node of the three wire headset assembly; and
receiving in the second mode, via the third signal wire, another one of the right speaker signal and the left speaker signal from the user device to another one of the right speaker node and the left speaker node of the three wire headset assembly.

8. The method of claim 6, further comprising selectively decoupling in the second mode the right speaker node and the left speaker node in the three wire headset assembly.

9. The method of claim 6, further comprising selectively providing in the second mode, via the first signal wire, the primary microphone signal from the three wire headset assembly to a primary microphone node of the user device.

10. The method of claim 6, further comprising receiving in the second mode, by the three wire headset assembly, a second control command from the user device, wherein the second control command causes decoupling of the right speaker node and the left speaker node in the three wire headset assembly.

11. The method of claim 10, wherein the second control command further causes decoupling one of the primary microphone node and the secondary microphone node in the three wire headset assembly from the second signal wire.

12. A method for communicating between a user device and a three wire headset assembly, comprising:
receiving in a first mode, via a first signal wire, a primary microphone signal from the three wire headset assembly to a primary microphone node of the user device; selectively coupling in the first mode, a secondary microphone node to a second signal wire;
receiving in the first mode, via the second signal wire, a secondary microphone signal from three wire headset assembly; and
selectively providing in the first mode, via a third signal wire, an audio signal from the user device to the three wire headset assembly.

13. The method of claim 12, further comprising:
determining that the three wire headset assembly is used for providing the primary microphone signal and the secondary microphone signal to the user device; and
selectively enabling the first mode responsive to the determination that the three wire headset assembly is used for providing the primary microphone signal and the secondary microphone signal to the user device.

14. The method of claim 12, further comprising:
determining that the three wire headset assembly is not used for providing the primary microphone signal and the secondary microphone signal to the user device; and
selectively enabling a second mode responsive to the determination that the three wire headset assembly is not used for providing the primary microphone signal and the secondary microphone signal to the user device.

15. The method of claim 14, further comprising:
selectively coupling one of a right speaker node and a left speaker node in the user device to the second signal wire;
providing in the second mode, via the second signal wire, one of a right speaker signal and a left speaker signal from the user device to the three wire headset assembly; and
providing in the second mode, via the third signal wire, another one of the right speaker signal and the left speaker signal from the user device to the three wire headset assembly.

16. The method of claim 14, further comprising receiving in the second mode, via the first signal wire, the primary microphone signal from the three wire headset assembly to the primary microphone node of the user device.

17. The method of claim 12, further comprising generating in the first mode a first control command by the user device, wherein the first control command causes selective coupling of the secondary microphone node in the user device to the second signal wire.

18. The method of claim 17, further comprising transmitting in the first mode the first control command from the user device to the three wire headset assembly, wherein the first control command causes: (a) coupling of a right speaker node and a left speaker node in the three wire headset assembly, and (b) coupling one of a primary microphone node and a secondary microphone node in the three wire headset assembly to the second signal wire.

19. The method of claim 12, further comprising generating in the second mode a second control command by the user device, wherein the second control command causes selective coupling of one of the right speaker node and the left speaker node in the user device to the second signal wire.

20. The method of claim 19, further comprising transmitting in the second mode the second control command from the user device to the three wire headset assembly, wherein the second control command causes: (a) decoupling of a right speaker node and a left speaker node in the three wire headset assembly, and (b) decoupling one of a primary microphone node and a secondary microphone node in the three wire headset assembly from the second signal wire.

21. A method for communicating between a user device and a three wire headset assembly, comprising:
   receiving in a first mode, via a first signal wire, a primary microphone signal from the three wire headset assembly to a primary microphone node of the user device;
   selectively coupling in the first mode, a secondary microphone node to a second signal wire;
   receiving in the first mode, via the second signal wire, a secondary microphone signal from three wire headset assembly;
   selectively providing in the first mode, via a third signal wire, an audio signal from the user device to the three wire headset assembly;
   determining that the three wire headset assembly is used for providing the primary microphone signal and the secondary microphone signal to the user device;
   responsive to the determination that the three wire headset assembly is used for providing the primary microphone signal and the secondary microphone signal to the user device, selectively enabling the first mode and performing two microphone noise suppression in the user device.

22. The method of claim 21, wherein the two microphone noise suppression comprises:
   subtracting a desired signal component from the secondary microphone signal to obtain a noise component signal;
   performing a first determination of at least one energy ratio related to the desired signal component and the noise component signal;
   performing a second determination of whether to adjust the noise component signal based on the at least one energy ratio;
   adjusting the noise component signal based on the second determination;
   subtracting the noise component signal from the primary acoustic signal to generate a noise subtracted signal; and
   outputting the noise subtracted signal.

23. A user device, comprising:
   an input/output device including a primary microphone node, a secondary microphone node, a right speaker node, and a left speaker node, wherein the input/output device is configured to receive, in a first mode, via a first signal wire, a primary microphone signal from a three wire headset assembly to the primary microphone node; and
   a switch configured to operatively couple, in the first mode, the secondary microphone node to a second signal wire, wherein, in the first mode, a secondary microphone signal is received via the second signal wire from three wire headset assembly; and
   wherein the input/output device is further configured to selectively provide, in the first mode, via a third signal wire, an audio signal from the user device to the three wire headset assembly.

24. The user device of claim 23, further comprising a controller configured to:
   determine that the three wire headset assembly is used for providing the primary microphone signal and the secondary microphone signal to the user device; and
   selectively enable the first mode responsive to the determination that the three wire headset assembly is used for providing the primary microphone signal and the secondary microphone signal to the user device.

25. The user device of claim 23, wherein the controller is further configured to:
   determine that the three wire headset assembly is not being used for providing the primary microphone signal and the secondary microphone signal to the user device; and
   selectively enable a second mode responsive to the determination that the three wire headset assembly is not being used for providing the primary microphone signal and the secondary microphone signal to the user device;
   wherein, in the second mode, the switch is configured to selectively couple the right speaker node and the left speaker node to the second signal wire so that one of a right speaker signal and a left speaker signal is provided from the user device to the three wire headset assembly; and
   wherein, in the second mode, the input/output device is configured to provide, via the third signal wire, a further right speaker signal and the left speaker signal from the user device to the three wire headset assembly.

26. The user device of claim 23, wherein controller is further configured to perform two-microphone noise suppression in the user device, wherein the two microphone noise suppression comprises:
   subtracting a desired signal component from the secondary microphone signal to obtain a noise component signal;
   performing a first determination of at least one energy ratio related to the desired signal component and the noise component signal;
   performing a second determination as to whether to adjust the noise component signal based on the at least one energy ratio;
   adjusting the noise component signal based on the second determination;
   subtracting the noise component signal from the primary acoustic signal to generate a noise subtracted signal; and
   outputting the noise subtracted signal.

* * * * *